United States Patent [19]
Kahn et al.

[11] Patent Number: 6,002,673
[45] Date of Patent: Dec. 14, 1999

[54] METHOD FOR CHANNEL MANAGEMENT IN A TDMA COMMUNICATION SYSTEM

[75] Inventors: Colin Leon Kahn, Cedar Knolls; Michael D. Turner, Madison, both of N.J.

[73] Assignee: Lucent Technologies Inc., Murray Hill, N.J.

[21] Appl. No.: 08/822,439

[22] Filed: Mar. 21, 1997

[51] Int. Cl.⁶ ............................................. G06F 11/00
[52] U.S. Cl. ............................... 370/252; 370/332
[58] Field of Search .................... 370/321, 252, 370/332, 333, 337, 343, 344, 480, 503; 455/63, 67.1, 67.3

[56] References Cited

U.S. PATENT DOCUMENTS 5,355,514  10/1994  Borg ........................................ 455/423

OTHER PUBLICATIONS

"IS–136.2–B Text Proposal to support DTX/CN", in Telecommunications Industry Association Standards Committee TR45.3.6/96.11.19.14 Bulletin, dated Nov. 19, 1996.

"IS–136–B DTX/CNI Feature", in Telecommunications Industry Association Standards Committee TR45.3.6/96.09.18.13 Bulletin, dated Sep. 18, 1996.

"TDMA Cellular/PCS—Radio Interface—Mobile Station—Base Station Compatibility—Traffic Channels and FSK Control Channel", TIA/EIA Interim Standard, (TIA/EIA/IS–136.2–A), pp: 1 through 11; 103, 104, 130, 168 through 173; 175, 177, 178, 181, 184, 185, 186, 189, 219, 228, 244, 245, 262, 288, 349, 350, and 357. Published in Oct., 1996 by the Telecommunications Industry Association, Standards & Technology Dept., 2500 Wilson Boulevard, Arlington, VA 22201.

*Primary Examiner*—Chi H. Pham
*Assistant Examiner*—Kim T. Nguyen
*Attorney, Agent, or Firm*—Christopher N. Malvone

[57] ABSTRACT

Interference signal power in a TDMA communication system is determined by taking samples of a received signal. The TDMA system has a plurality of communication frequencies with sequences of frames communicated at each of the communication frequencies. Each of the frames contain a plurality of time slots, where each time slot is associated with a communication channel. The interference signal power is determined by receiving a signal at one of the plurality of communication frequencies. The signal is sampled for at least one frame period. The interference signal power is calculated using the M larger amplitude samples of the signal, where M is the number of samples that are taken during a period of time that corresponds to a length of one time slot.

3 Claims, 3 Drawing Sheets

METHOD FOR CHANNEL MANAGEMENT IN A TDMA COMMUNICATION SYSTEM

RELATED APPLICATION

This application is related to the concurrently filed and commonly assigned application entitled "TDMA System With Discontinuous Transmission," Ser. No. 08/821479, and a continuation of Ser. No. 08/821479 entitled "TDMA System With Discontinuous Transmission," Ser. No. 09/240943, filed Jan. 29, 1999.

BACKGROUND OF THE INVENTION

1. Field of the Invention

The present invention relates to communications; more specifically, wireless communications.

2. Description of the Related Art

In a TDMA (Time Division Multiple Access) system, communication channels between a base station and a mobile communication device are defined in terms of a frequency and time slot. Each communication channel is assigned to a frequency and one of multiple time slots transmitted on a given frequency. In the case of systems adhering to TIA (Telecommunications Industry Association) Standard IS-136.2, three time slots are associated with each frequency. As a result, three channels are assigned to each frequency.

FIG. 1 illustrates an arrangement of time slots as defined by Standard IS-136.2. A sequence of frames is transmitted where each frame contains six time slots. Each time slot contains the data associated with a communication channel. The half-frames contain 60 milliseconds of information where each time slot contains 20 milliseconds of information. Each time slot contains 324 bits. As a result, for a given communication channel, 324 bits of information are transmitted each half-frame.

FIG. 2 illustrates the different fields associated with the 324 bits from one of the slots of FIG. 1. The fields are defined by Standard IS-136.2. Field 40 is labeled G and is used as a guard field between slots and contains 6 bits. Field 42 is a ramp field having 6 bits which are used to provide time for a mobile transmitter to reach full operating power after being off for the previous slots. DATA field 44 is 16 bits long and is used to transmit data. SYNCH field 46 is 28 bits long and is used to transmit a synchronization pattern. DATA field 48 is 122 bits long and is used to transmit data. SACCH field 50 is 12 bits long and is used to transmit the SACCH message (Slow Associated Control Channel). This field is used to exchange signaling messages between the base station and mobile device. These signaling messages include information regarding the quality of the channel. CDVCC field 52 is 12 bits long and is used to transmit the CDVCC message (Coded Digital Verification Color Code). This channel is used to indicate that the base station and mobile device are exchanging proper data. DATA field 54 is 122 bits long and is used to transmit data. The data fields are typically used to carry information such as speech data. The Standard also permits replacing data fields 48 and 54 with a FACCH field (Fast Associated Control Channel) message. This message is used to exchange information between the mobile and base station in situations such as handoffs. It should be noted that during this time the voice data is blanked so that the signaling message may be passed between the mobile and base station.

Communications between a base station and a mobile communication device include messages containing data corresponding to speech. In many conversations, it is typical for moments of silence to occur. As a result, messages carried between the base station and mobile device are carrying data representative of silence. This is wasteful because mobile unit battery power is being used to transmit information representative of silence, and in addition, other channels are receiving interference from a channel that is only transmitting data indicative of silence.

One suggested solution to avoid wasting transmissions by sending data representative of silence or absence of voice is to stop transmitting in periods of silence except for transmissions containing information relating to channel quality. In a one second period of relative silence, only three transmissions rather than 50 transmissions would be sent. The three transmissions are in the 324 bit form of FIG. 2 and contain the channel quality data in DATA fields 44, 48, and 54. This solution offers the advantage of reducing co-channel interference and reducing battery drain at the mobile; however, it creates a problem for the party receiving the message. The party receiving the message will simply hear silence as opposed to background noise when no transmissions are made. This may make the users feel as if the call has been dropped when in reality it is simply a silence transmission.

A second suggested solution addresses this problem. Once again, a period of silence is detected using a voice activity detector, and transmission stops except for five transmissions per second. The five transmissions are in the 324 bit form of FIG. 2. Three of the five transmissions are used to transmit channel quality information in DATA fields 44, 48, and 54. The remaining two transmissions are used to transmit comfort noise information in same DATA fields. Comfort noise information is information representative of background noise that is transmitted to a receiver. The receiver uses the comfort noise information to generate background noise that a user may hear. As a result, in periods of silence a user still can hear background noise and therefore be assured that the communication channel has not been interrupted.

Both of these solutions suffer from the same problem. They both make it difficult for a base station to monitor channel quality when choosing an available channel for assignment to a new call. It should be noted that during a period of silence, the transmitter at the mobile is turned off for a large majority of the time (45 out of 50 possible transmission times). When the base station makes an interference measurement, it may get a false low interference reading based on a mobile that is temporarily not transmitting. As a result, the base station may assign a low quality channel to a new call.

SUMMARY OF THE INVENTION

An embodiment of the present invention solves the aforementioned problems by continuing to transmit in each time slot during periods of silence; however, the number of bits transmitted in the time slot is reduced to save battery power and to limit interference in other channels. The reduced number of bits are used to carry channel quality information and comfort noise information. As a result, this embodiment of the present invention allows transmission of comfort noise during periods of silence and still allows an accurate measurement of interference when assigning a channel to a new call.

Another embodiment of the present invention provides a method for measuring channel interference in a TDMA system that has flexible frequency assignment between base stations. When signal power associated with a particular frequency is measured, synchronization to the half-frames being transmitted is not needed. Samples are taken over a period of time corresponding to one half-frame in the frequency of interest. The signal samples having the largest signal strength or amplitude over a period of time equal to one time slot within a half-frame are used to make an estimate of the power being received at a particular frequency. If that power is below a threshold, the base station making the measurement may use that frequency for transmitting information.

In yet another embodiment of the present invention, channel interference within a cell of a TDMA communication system is measured. In this embodiment, the abbreviated messages are transmitted during, for example, periods of silence or periods when an absence of a voice signal is detected. The measure of the power associated with the channel is made by synchronizing to the time slot associated with the channel to be measured, and then signal samples are taken over the entire time slot. The largest amplitude samples over a period equal to the time period associated with the abbreviated transmission or message are used to make the power measurement or calculation. If the power measured for that particular channel is below a threshold, that channel may be assigned to a new call.

DETAILED DESCRIPTION OF THE INVENTION

Figure 3:
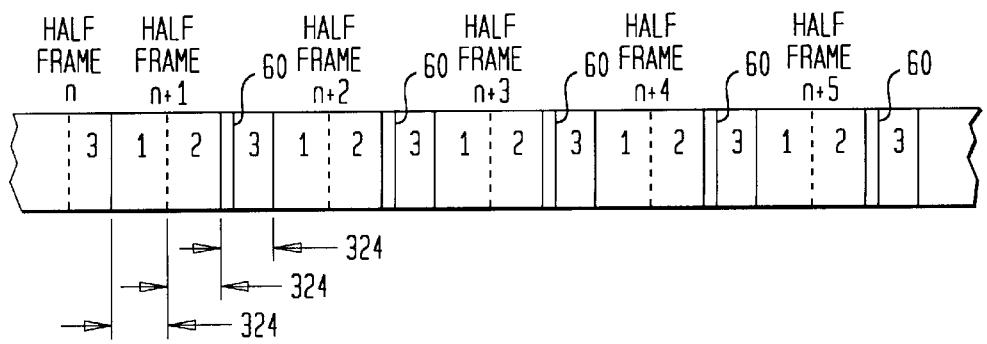
FIG. 3 illustrates several half-frames with time slot 3 carrying a message associated with a period of silence.

FIG. 3 illustrates a sequence of half-frames for a particular frequency in a TDMA system. Each half-frame is broken into three time slots where each slot is associated with a communication channel. If, for example, slots 1 and 2 are not transmitting periods of silence, the full 324 bits associated with the slot are transmitted. If the communication channel using time slot 3 is in a period of silence, only 80 bits of information are transmitted during the time slot This is illustrated by shaded region 60 in each time slot 3. As a result, there remains only a small portion of time slot 3 used for actual transmission. During the remaining portion of time slot 3, no transmissions are present and as a result, power drain and co-channel interference are reduced. In this example, the width of shaded region 60 is only 80 bits. However, the width of region 60 may be increased or decreased by transmitting more bits or less bits, respectively.

Figure 1:
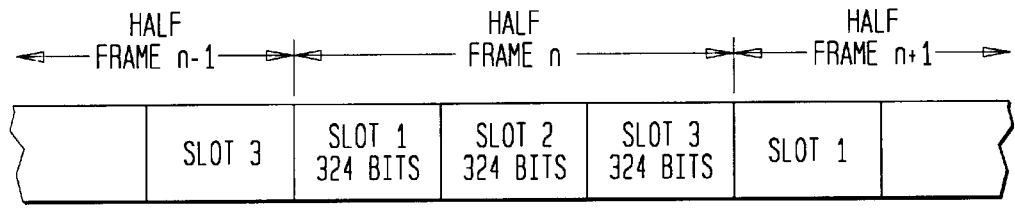
FIG. 1 illustrates a series of half-frames associated with a single frequency of a TDMA system.
Figure 2:
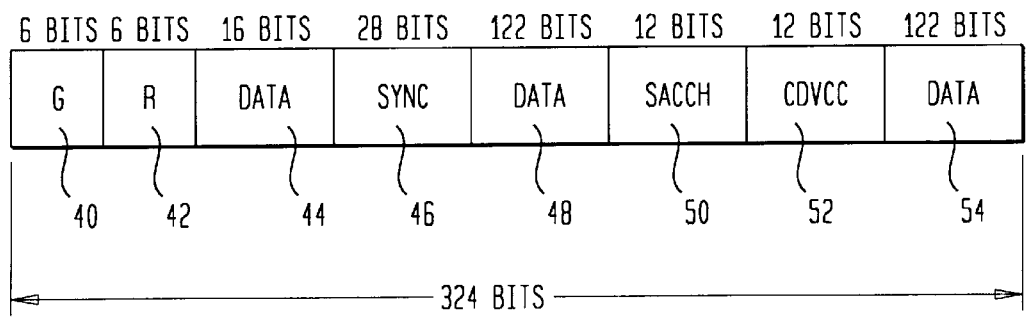
FIG. 2 illustrates the fields of one of the time slots of FIG. 1.
Figure 4:
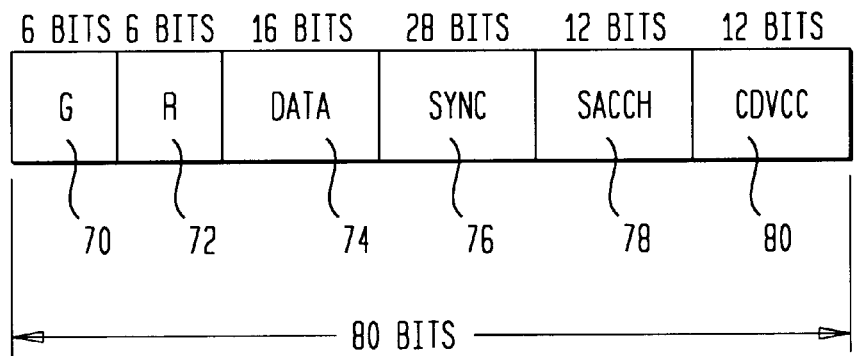
FIG. 4 illustrates the fields of an abbreviated message.

FIG. 4 illustrates the fields that are transmitted when periods of silence are detected. A time slot will still be 324 bits long, however, only 80 bits will be transmitted. This provides a reduction of power thereby increasing battery life and also reducing co-channel interference. When periods of silence are detected, the 80 bits of FIG. 4 are transmitted instead of 324 bits of FIG. 2. Once again, field 70 is a guard field of 6 bits and field 72 is a ramp field of 6 bits. Field 74 is a data field containing 16 bits and field 76 is a synchronization field containing 28 bits. Field 78 carries an SACCH message and is 12 bits long. Field 80 is 12 bits long and contains the CDVCC message. When silence or absence of voice is detected, either the mobile or base station transmits the 80 bit field and places the channel quality information in field 78 as an SACCH message and places the comfort noise in field 74. The 80 bits of FIG. 4 are transmitted in each time slot associated with the communication channel.

Since a transmission is made during each time slot associated with the communication channel, when co-channel interference is measured, the measurements are made using samples from the first part of the time slot so as to get an accurate measurement of interference.

Figure 5:
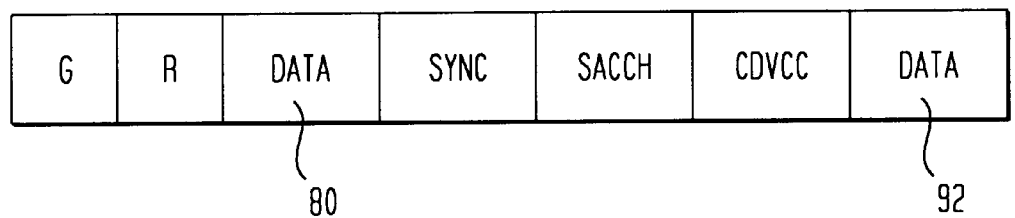
FIG. 5 illustrates the fields of another abbreviated message format.
Figure 6:
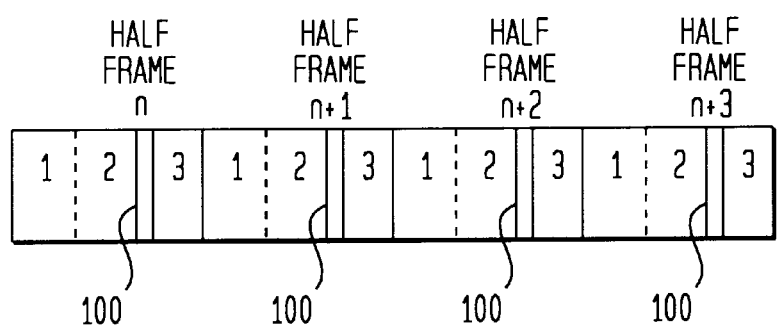
FIG. 6 illustrates several half-frames with time slot 3 carrying difference abbreviated messages.

It should be noted that the number of bits transmitted during a period of silence need not be limited to 80 bits and need not be limited to the fields specified in FIG. 4. For example, it is possible to vary the number of bits associated with each field or to add or subtract fields from those shown in FIG. 4. For example, FIG. 5 illustrates sending additional data field 92 after the CDVCC field. It is also possible to place comfort noise information in data field 90 of FIG. 5 while placing fax or modem data in data field 92. Recalling FIG. 4, it is also possible to transmit the comfort noise information in field 74 for a portion of the time and to send other types of data in data field 74 the rest of the time. For example, use of data field 74 may be used for different purposes in different half-frames. FIG. 6 illustrates half-frames N, N+1, N+2, and N+3. Each half-frame contains three time slots. In this example we are assuming the channel associated with time slot 3 is transmitting silence and therefore an abbreviated message is being transmitted in place of the usual longer message. This shortened amount of data or number of bits is indicated by shaded area 100. In half-frame N, comfort noise data may be transmitted in field 74. In half-frames N+1 additional comfort noise data may be transmitted while in half-frames N+2 and N+3 data associated with a fax, a modem, or e-mail may be transmitted. It is possible to transmit as few as 1 or 2 half-frames containing comfort noise per second while using the other half-frames to transmit other information. For example, two out of 50 half-frames per second may be used to transmit comfort noise while the remaining 48 half-frames may be used for transmitting other data.

Figure 7:
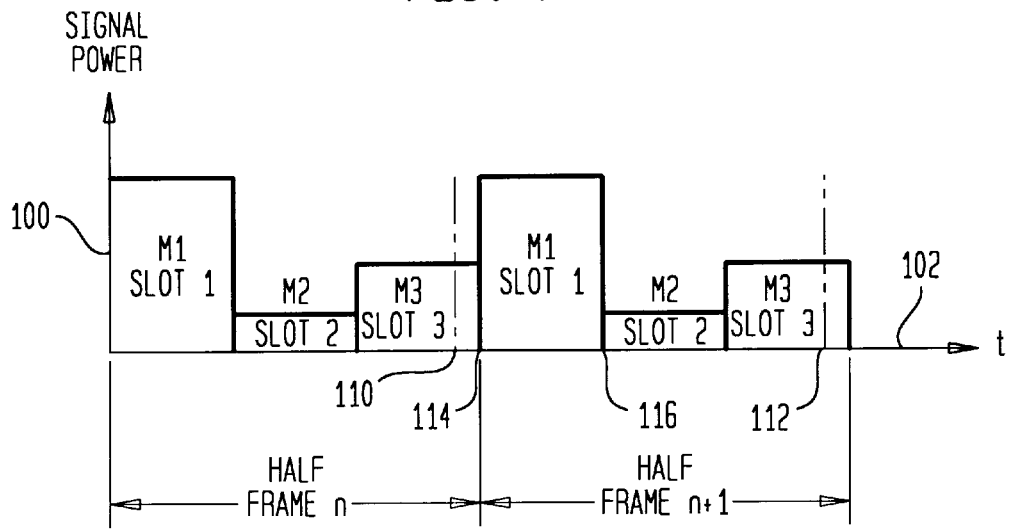
FIG. 7 illustrates signal power associated with different time slots within two half-frames of a TDMA system.

FIG. 7 illustrates the signal power associated with different time slots of a TDMA system for two consecutive half-frames. Signal power is indicated on axis 100 and time is indicated on axis 102. Each half-frame includes time slots 1, 2, and 3. In this example, mobile 1 transmits during time slot 1, mobile 2 transmits during time slot 2, and mobile 3 transmits during time slot 3. It can be seen that mobile 1 which transmits in time slot 1 is transmitting at a higher power than either mobiles 2 or 3.

When a base station is examining the signal power at a particular frequency for purposes of using that frequency for transmission within its cell, samples of signal strength are taken for a time equal to one half-frame. For purposes of determining interference from mobiles transmitting in another cell, the mobile transmitting at the highest power is the one that will produce the most interference. As a result, the largest samples taken over a period of time equivalent to one time slot are used.

As an example of sampling without synchronization to the half-frame rate, sampling can begin at time 110 and continue until time 112 where times 110 and 112 are one half-frame period apart. The largest M samples, where M is equal to the number of samples in one time slot, are then used to make an estimate of the interfering power associated with this frequency. In this case, the largest samples are associated with mobile 1 which was received between time slots 114 and 116. The distance between time 114 and 116 is one time slot wide or 20 milliseconds in an IS-136.2 system. If the power calculated using the signal measurements taken between times 114 and 116 is below a threshold, this frequency will be used by the base station for assigning communication channels to new calls. If the power associated with the signal measurements is over a threshold, the base station will not use this frequency for communications because there will be too much interference from mobile 1.

Of N samples collected during an entire half-frame, the M samples having the larger amplitudes are used. M corresponds to the number of samples that are taken during one time slot. M may be calculated using M equals N times $K_1$, where $K_1$ corresponds to the amount of transmission time associated with one mobile or time slot. For example, for a system that is Standard IS-136.2 compliant, $K_1$ equals ⅓. That is, one time slot corresponds to ⅓ of a half-frame.

Figure 8:
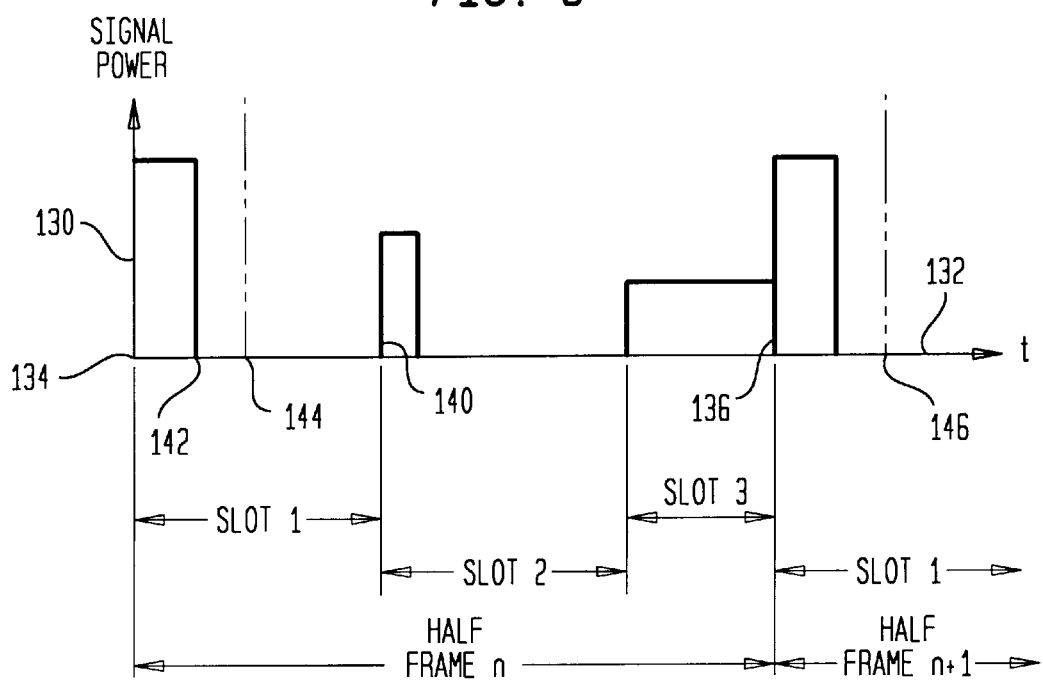
FIG. 8 illustrates the signal power associated with different time slots of a half-frame in a TDMA system using abbreviated messages for periods of silence.

FIG. 8 illustrates the power transmitted in different time slots of a TDMA system where abbreviated messages are substituted for longer messages when an absence of a voice signal is detected. Axis 130 indicates signal power and axis 132 indicates time. Time 134 indicates the beginning of a half-frame and time 136 indicates the end of a half-frame. The half-frame includes three time slots each associated with a channel for communication. Time slot 1 which is associated with mobile 1 illustrates an abbreviated transmission associated with, for example, a period of silence. Likewise, time slot 2 which is associated with communications from mobile 2 is also transmitting an abbreviated message. Time slot 3 which is associated with mobile 3 transmits over the entire time slot.

When a base station in a system that substitutes abbreviated messages for longer messages during a period lacking a voice signal measures the interference at a particular frequency to determine whether that frequency is available for communication, the maximum interference associated with a channel using that frequency is measured. This measurement may be carried out without synchronizing to the half-frame being transmitted by the other base station or mobile. For example, sampling may begin at time 144 and continue for one half-frame period until time 146. The interference associated with that frequency can be determined by taking the M largest samples received during the sample period in time 144 to time 146. In this case, since abbreviated messages may be transmitted, M equals the number of sample times in an abbreviated message rather than the number of sample times in an entire time slot. In this example, M equals 80.

When a base station measures interference in a particular channel, the signal strength measurement is synchronized to a time slot. Signal measurements are then taken over the entire time slot and then only the larger samples collected over a period corresponding to an abbreviated message are used to determine the signal strength within that time slot. For example, to measure the signal power associated with time slot 1, samples are taken from time 134 through time 140. Of the N samples taken between times 134 and 140, the M larger samples are used to determine the interference in the time slot. In this case, M is equal to the number of sample times in an abbreviated message. For example, if the abbreviated message is 80 sample periods long, M is equal to 80. In other words, the number of samples used to determine the signal power are the number of samples associated with a period of time that is equal to the time during which an abbreviated message is transmitted. In this case, the M samples correspond to samples taken between time 134 and 142. If the power calculated using the M signal samples is above a threshold, this channel will not be assigned for communication, and if the power is below a threshold the channel will be assigned to a new call.

The invention claimed is:

1. A method for determining interference signal power in a TDMA communication system having a plurality of communication frequencies with sequences of frames communicated at each of the communication frequencies, each of the frames containing a plurality of time slots, where each time slot is associated with a communication channel, the method comprising the steps of:

receiving a signal at one of the plurality of communication frequencies;

sampling the signal for at least one half-frame period to produce N samples of the signal; and using M of the N samples to calculate the interference signal power, where the M samples are larger amplitude samples of the signal, where M is the number of samples that are taken during a period of time that corresponds to a length of one time slot and where M is less than N.

2. A method for determining interference signal power in a TDMA communication system having a plurality of communication frequencies with sequences of frames communicated at each of the communication frequencies, each of the frames containing a plurality of time slots, where each time slot is associated with a communication channel and where a shorter message in a time slot is substituted for a longer message in the time slot when an absence of a voice signal is detected, the method comprising the steps of:

receiving a signal at one of the plurality of communication frequencies;

sampling the signal for at least one half-frame period to produce N samples of the signal; and using M of the N samples to calculate the interference signal power, where the M samples are larger amplitude samples of the signal, where M is the number of samples that are taken during a period of time that corresponds to a length of a shorter message and M is less than N.

3. A method for determining interference signal power in a TDMA communication system having a plurality of communication frequencies with sequences of frames communicated at each of the communication frequencies, each of the frames containing a plurality of time slots, where each time slot is associated with a communication channel and where a shorter message in a time slot is substituted for a longer message in the time slot when an absence of a voice signal is detected, the method comprising the steps of:

receiving a signal at one of the plurality of communication frequencies;

sampling the signal for at least one time slot to produce N samples of the signal;

synchronizing the sampling to begin at a start of a time slot and to end at an end of the time slot; and using M of the N samples to calculate the interference signal power, where the M samples are larger amplitude samples of the signal, where M is the number of samples that are taken during a period of time that corresponds to a length of a shorter message and where M is less than N.

* * * * *